United States Patent
Takeda

(10) Patent No.: US 7,660,212 B2
(45) Date of Patent: Feb. 9, 2010

(54) OPTICAL DISK APPARATUS

(75) Inventor: Futoshi Takeda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 518 days.

(21) Appl. No.: 11/709,754

(22) Filed: Feb. 23, 2007

(65) Prior Publication Data
US 2007/0206457 A1    Sep. 6, 2007

(30) Foreign Application Priority Data
Mar. 3, 2006    (JP)    ............................ P2006-057351

(51) Int. Cl.
*G11B 7/00*    (2006.01)
(52) U.S. Cl. ................. 369/44.32; 369/53.28
(58) Field of Classification Search .................. None
See application file for complete search history.

(56) References Cited

U.S. PATENT DOCUMENTS

| 6,917,571 | B2* | 7/2005 | Kusumoto et al. | 369/44.29 |
| 2003/0117912 | A1* | 6/2003 | Yoshimi et al. | 369/44.28 |
| 2006/0007805 | A1* | 1/2006 | Nishida et al. | 369/44.29 |

FOREIGN PATENT DOCUMENTS

| JP | 2000-76668 | 3/2000 |
| JP | 2004-326910 | 11/2004 |
| JP | 2005-71545 | 3/2005 |

* cited by examiner

*Primary Examiner*—Paul Huber
(74) *Attorney, Agent, or Firm*—Morgan, Lewis & Bockius LLP

(57) ABSTRACT

An optical disk apparatus includes: a servo controller, operable to carry out a servo control of tracking of an optical pickup based on a tracking error signal; a TE balance regulator, operable to detect a TE balance correction value for equalizing, with a reference voltage, a central voltage of the tracking error signal when a beam spot of the optical pickup crosses a track; a detrack regulator, operable to detect a detrack correction value for causing signal quality of an output of the optical pickup to be the highest; and a TE offset corrector, operable to set an offset voltage, which is to be added to the tracking error signal, to be the TE balance correction value when a difference between the TE balance correction value and the detrack correction value is smaller than a predetermined value, and to set the offset voltage to be a value between the TE balance correction value and the detrack correction value when the difference is greater than the predetermined value.

4 Claims, 11 Drawing Sheets

OPTICAL DISK APPARATUS

CROSS-REFERENCE TO RELATED APPLICATIONS

This application is based upon and claims the benefit of priority from prior Japanese patent application No. 2006-057351, filed on Mar. 3, 2006, the entire contents of which are incorporated herein by reference.

BACKGROUND OF THE INVENTION

The present invention relates to an optical disk apparatus, and more particularly to an optical disk apparatus for detecting a TE balance correction value to be an offset voltage for setting an amount of a shift of a TE balance to be zero and a detrack correction value to be an offset voltage for obtaining the highest signal quality of an output of an optical pickup.

In an apparatus for reproducing data recorded on an optical disk, the following technique has been proposed in order to enhance precision in a tracking servo and to improve the signal quality of a reproducing signal (which will be referred to as a first related art). More specifically, in the technique, focus-ON is carried out by executing a servo control of focusing and track-ON is carried out by executing a servo control of tracking as shown in FIG. 12. In this state, there is carried out a defocus regulation for adding an offset voltage to a focus error signal (which will be hereinafter referred to as an FE signal) in such a manner that a jitter amount of an RF signal is a minimum (an amplitude of the RF signal is a maximum). Then, a tracking servo is turned OFF and an offset voltage is added to a tracking error signal (which will be hereinafter referred to as a TE signal) obtained when a beam spot crosses a track in such a manner that a central voltage of the TE signal is equal to a reference voltage, that is, an amount of a shift of a balance of the TE signal (which will be hereinafter referred to as a TE balance) is zero. When the amount of a shift of the TE balance is set to be zero, the most stable tracking servo can be obtained. Also in the case in which a recording plane of the optical disk has scratches and dirt, subsequently, the tracking is carried out without causing a shift (for example, see JP-A-2000-76668).

Moreover, the following technique has been proposed (which will be referred to as a second related art). More specifically, in the technique, an offset voltage (to be added to a TE signal) for setting an amount of a shift of a TE balance to be zero which is generated when an objective lens of an optical pickup is shifted by a predetermined amount is calculated and stored at time of a boot in which an initialization is to be carried out. When a seeking operation is to be carried out over a target track, furthermore, an amount of a shift of the objective lens is calculated during the seeking operation. Then, the offset voltage for setting, to be zero, the amount of a shift of the TE balance obtained when it reaches the calculated amount of a shift, is calculated by referring to an offset voltage which is stored, and the offset voltage thus calculated is added to the TE signal. When a servo control of tracking is restarted after the seeking operation, accordingly, the most stable tracking can be carried out. Therefore, track-ON is reliably carried out so that precision in the seeking operation can be enhanced (for example, see JP-A-2004-326910).

Furthermore, the following technique has been proposed (which will be referred to as a third related art). More specifically, in the technique, the offset voltage for setting the amount of a shift of the TE balance to be zero is added to the TE signal when a jump mode is brought, and an offset voltage having a jitter and an error rate minimized is added to the TE signal when a mode following a track (a mode for carrying out a reproduction) is brought. Accordingly, it is possible to carry out a stable track jump and a reproduction having a low error rate (for example, see JP-A-2005-71545).

In the case in which the first related art is used, however, the following problem arises. More specifically, in an apparatus for generating a TE signal by a DPD method, in the case in which a CD is reproduced (mainly a CD-R or a CD-RW), there are some apparatuses in which an amount of a shift (an amount of detrack) from a central position of a track of a beam spot is increased due to a shift of an attachment position of a PDIC that is a device for detecting a reflected light and a variation in a sensitivity of a region of the PDIC which is divided into four parts also when the offset voltage for setting the amount of a shift of the TE balance to be zero is added to the TE signal. When the CD is reproduced by using an apparatus in which the amount of detrack is increased, the jitter is increased. Consequently, there is a problem in that an error rate is reduced and the signal quality of a reproduction is deteriorated.

Referring to the second related art, the offset voltage for setting the amount of a shift of the TE balance to be zero is varied depending on the amount of a shift of the objective lens. Consequently, the offset voltage corresponding to the amount of a shift is calculated and is added to the TE signal so that a stability of tracking after a seeking operation can be maintained. For this reason, the second related art is hard to apply in respect of the solution of the problem in the first related art.

Referring to the third related art, the offset voltage for setting the amount of a shift of the TE balance to be zero is added to the TE signal when the jump mode is brought, and the offset voltage having a jitter and an error rate minimized is added to the TE signal when a mode following a track (a mode for carrying out a reproduction) is brought. For this reason, the technique is hard to apply in respect of the solution of the problem in the first related art.

SUMMARY

It is therefore an object of the invention to provide an optical disk apparatus capable of suitably suppressing a deterioration in signal quality of a reproducing signal without damaging a stability of a servo control of tracking and stabilizing a seeking operation also when suppressing the deterioration in the signal quality of the reproducing signal.

In order to achieve the object, according to the invention, there is provided an optical disk apparatus comprising:

servo control means for carrying out a servo control of tracking of an optical pickup based on a tracking error signal;

TE balance regulating means for detecting a TE balance correction value to be an offset voltage, which is to be added to the tracking error signal, for equalizing, with a reference voltage, a central voltage of the tracking error signal when a beam spot of the optical pickup crosses a track;

detrack regulating means for detecting a detrack correction value to be an offset voltage, which is to be added to the tracking error signal, for causing signal quality of an output of the optical pickup to be the highest; and TE offset correcting means for setting an offset voltage, which is to be added to the tracking error signal, to be the TE balance correction value when the beam spot is caused to follow the track and a difference between the TE balance correction value and the detrack correction value is smaller than a predetermined value, setting the offset voltage, which is to be added to the tracking error signal, to a value being close to a side of the TE balance correction value by the predetermined value from the detrack correction value when the beam spot is caused to follow the track and there is brought a detrack increasing state in which the difference is greater than the predetermined value, and setting the offset voltage, which is to be added to the tracking error signal, to be the TE balance correction value when a seeking operation is carried out.

DETAIL DESCRIPTION OF PREFERRED EMBODIMENTS

An embodiment of the invention will be described below with reference to the drawings.

EXAMPLE 1

Figure 1:
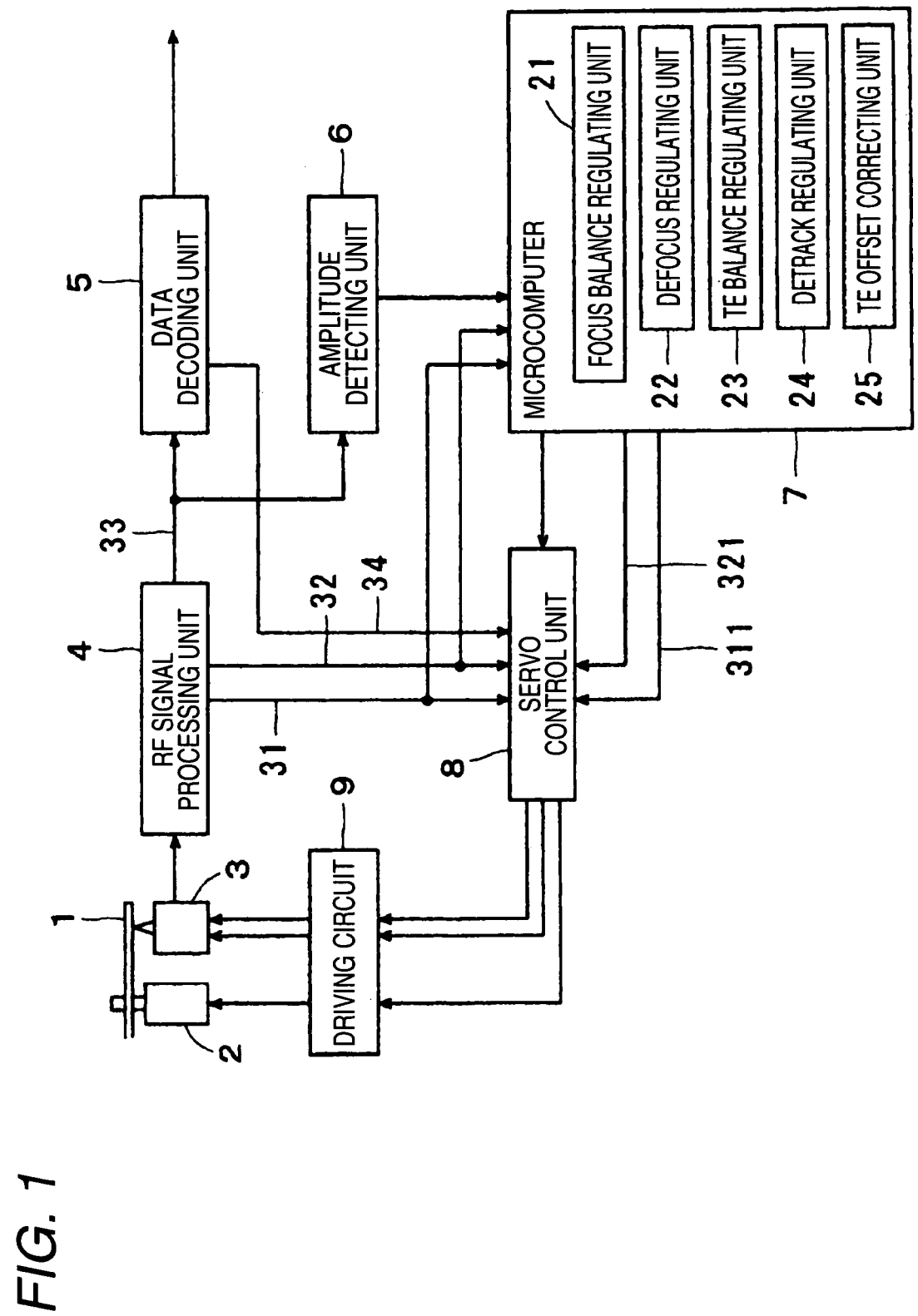
FIG. 1 is a block diagram showing an electrical structure of a front end of a DVD player according to an embodiment of an optical disk apparatus in accordance with the invention.

FIG. 1 is a block diagram showing an electrical structure of a front end of a DVD player according to a first embodiment of an optical disk apparatus in accordance with the invention.

In FIG. 1, an optical pickup 3 irradiates a laser beam having a wavelength corresponding to an optical disk 1 (a CD-ROM, a CD-R, a CD-RW, a DVD-ROM, a DVD-R, a DVD-RW or a DVD-RAM) which is rotated and driven by a spindle motor 2 onto the optical disk 1 and detects a light reflected from the optical disk 1.

An RF signal processing unit 4 generates a tracking error signal (which will be hereinafter referred to as a TE signal) 31 and a focus error signal (which will be hereinafter referred to as an FE signal) 32 from an output of the optical pickup 3, and outputs them to a servo control unit 8 and a microcomputer 7. Moreover, the RF signal processing unit 4 generates an RF signal 33 and outputs the RF signal 33 to a data decoding unit 5 and an amplitude detecting unit 6.

The data decoding unit 5 generates a reproducing clock from the RF signal 33 and outputs a clock 34 thus generated to the servo control unit 8. Moreover, the data decoding unit 5 demodulates digital data by using the reproducing clock, and decodes the demodulated digital data and corrects an error, thereby reproducing data recorded on the optical disk 1. The reproduced data are output to a data processing unit which is not shown (a D/A conversion is carried out when the reproduced data are a linear PCM signal, and the D/A conversion is carried out after an expansion processing is executed when the reproduced data are compressed video voice information).

The servo control unit 8 carries out a servo control over tracking of the optical pickup 3 through a driving circuit 9 based on the TE signal 31. Moreover, the servo control unit 8 carries out the servo control over focusing of the optical pickup 3 through the driving circuit 9 based on the FE signal 32. Moreover, the servo control unit 8 carries out the servo control over a rotation of the spindle motor 2 through the driving circuit 9 based on the clock 34. The driving circuit 9 amplifies a signal output from the servo control unit 8 and outputs the amplified signal to a tracking actuator (not shown) or a focusing actuator (not shown) in the optical pickup 3. Furthermore, the driving circuit 9 amplifies a signal for the spindle motor 2 which is output from the microcomputer 7, thereby driving the spindle motor 2.

The amplitude detecting unit 6 detects a peak level and a bottom level of the RF signal 33 and calculates a difference between the peak level and the bottom level which are detected, and outputs a result of the calculation as a signal indicative of an amplitude of the RF signal 33 to the microcomputer 7.

The microcomputer 7 controls a main control of a front end. More specifically, when the optical disk 1 is attached, a type of the attached optical disk 1 is distinguished. Moreover, the microcomputer 7 controls a start and stop of the servo control of the focusing and the tracking, and a start and stop of the rotation of the spindle motor 2. Furthermore, the microcomputer 7 regulates a TE balance, defocus and detrack. For this reason, the microcomputer 7 includes a focus balance regulating unit 21, a defocus regulating unit 22, a TE balance regulating unit 23, a detrack regulating unit 24 and a TE offset correcting unit 25 as a part of the functions.

The focus balance regulating unit 21 detects an offset voltage required for setting a central voltage of the FE signal 32 to be a reference voltage (for example, 1.65V which is a half of 3.3V that is a source voltage) from a change in a level of the FE signal 32 which is obtained when the focusing actuator is driven. Then, the focus balance regulating unit 21 outputs an offset voltage 321 thus detected to the servo control unit 8 (The offset voltage 321 is added to the FE signal 32 in the servo control unit 8).

At this time, the offset voltage 321 can carry out the servo control of the focusing most stably. However, a characteristic of the optical pickup 3 has a variation. In some cases, therefore, the offset voltage 321 is not coincident with an offset voltage required for setting a focal position of a beam spot onto a recording plane of a track with high precision.

The defocus regulating unit 22 detects an offset voltage for maximizing an amplitude based on a change in an amplitude of the RF signal 33 with a change in the offset voltage 321 to be added to the FE signal 32. Then, the defocus regulating unit 22 outputs the offset voltage 321 thus detected to the servo control unit 8 (The offset voltage 321 is added to the FE signal 32 in the servo control unit 8). At this time, the offset voltage 321 is such an offset voltage as to be required for setting the focal position of the beam spot onto the recording plane of the track with high precision (such an offset voltage as to give the highest signal quality of an output of the optical pickup 3 (which will be hereinafter referred to as signal quality)) in the servo control of the focusing.

The TE balance regulating unit 23 detects an offset voltage required for setting a central voltage of the TE, signal 31 to be a reference voltage (for example, 1.65V which is a half of 3.3V that is the source voltage) (for setting an amount of a shift of a TE balance to be zero) based on a change in a level of the TE signal 31 which is obtained when the beam spot crosses the track. Moreover, the TE balance regulating unit 23 outputs a detected offset voltage 311 to the servo control unit 8 if necessary (the offset voltage 311 is added to the TE signal 31 in the servo control unit 8).

At this time, the offset voltage (the TE balance correction value) 311 can carry out the servo control of the tracking most stably. However, the characteristic of the optical pickup 3 has a variation. In some cases, therefore, the offset voltage 311 is not coincident with an offset voltage required for positioning the beam spot onto a center of the track with high precision.

The detrack regulating unit 24 detects an offset voltage (a detrack correction value) to maximize an amplitude based on a change in the amplitude which is obtained when the offset voltage 311 to be added to the TE signal 31 is changed. Then, the detrack regulating unit 24 outputs the offset voltage 311 thus detected to the servo control unit 8 if necessary (The offset voltage 311 is added to the TE signal 31 in the servo control unit 8). At this time, the offset voltage (the detrack correction value) 311 is such an offset voltage as to be required for positioning the beam spot onto the center of the track with high precision (such an offset voltage as to give the highest signal quality in the servo control of the tracking).

The TE offset correcting unit 25 sets, to be the TE balance correction value, the offset voltage 311 to be added to the TE signal 31 when a difference between the TE balance correction value and the detrack correction value is smaller than a predetermined value, that is, an amount of detrack obtained when setting the offset voltage 311 to be a voltage giving an amount of a shift of the TE balance to be zero (the TE balance correction value) is smaller than the predetermined value. On the other hand, the TE offset correcting unit 25 sets the offset voltage 311 to be added to the TE signal 31 as a voltage between the TE balance correction value and the detrack correction value when the difference between the TE balance correction value and the detrack correction value is greater than the predetermined value (the detrack increasing state), that is, in the case in which the amount of detrack obtained when setting the offset voltage 311 to be the voltage giving the amount of a shift of the TE balance to be zero (the TE balance correction value) is larger than the predetermined value.

Since the detrack increasing state is brought, the offset voltage 311 to be added to the TE signal 31 is set to have a value which is close to the side of the TE balance correction value from the detrack correction value by the predetermined value when the offset voltage 311 is set to be a voltage between the TE balance correction value and the detrack correction value (which will be described below in detail).

Figure 2:
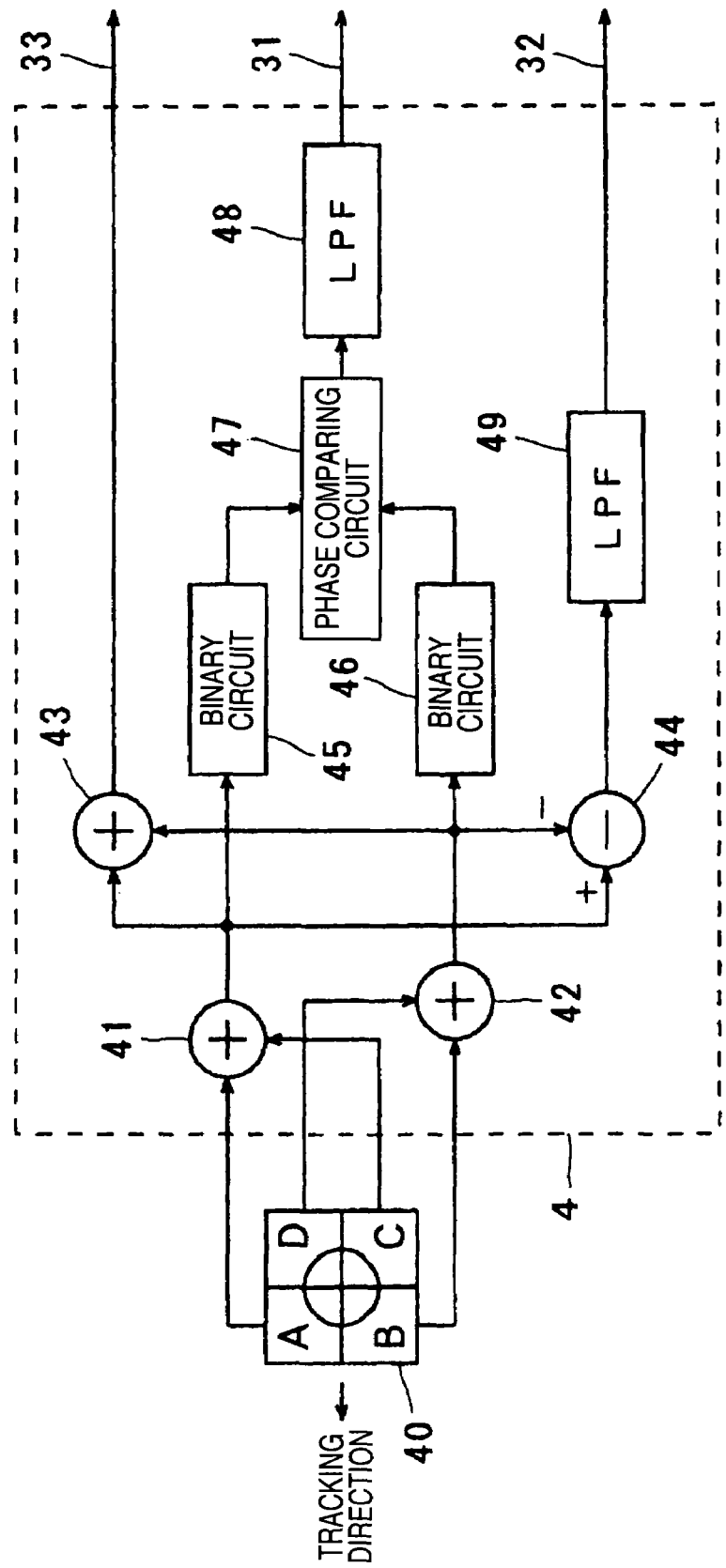
FIG. 2 is a block diagram showing a detailed electrical structure of an RF signal processing unit.

FIG. 2 is a block diagram showing a detailed electrical structure of the RF signal processing unit 4.

An adder 41 adds an output of an A region (which will be hereinafter referred to as A) and an output of a C region (which will be hereinafter referred to as C) in a light receiving unit 40 provided in the optical pickup 3. An adder 42 adds an output of a B region (which will be hereinafter referred to as B) and an output of a D region (which will be hereinafter referred to as D) in the light receiving unit 40.

An adder 43 adds an output (A+C) of the adder 41 and an output (B+D) of the adder 42, thereby generating the RF signal 33 (A+B+C+D). A subtracter 44 subtracts the output (B+D) of the adder 42 from the output (A+C) of the adder 41, thereby generating an FE signal ((A+C)−(B+D)). A low-pass filter 49 outputs the FE signal 32 obtained by removing an unnecessary high frequency component from the FE signal output from the subtracter 44.

A binary circuit 45 compares the output of the adder 41 with a predetermined level, thereby causing the output of the adder 41 to be binary. A binary circuit 46 compares the output of the adder 42 with the predetermined level, thereby causing the output of the adder 42 to be binary. A phase comparing circuit 47 compares a phase of an output of the binary circuit 45 with that of an output of the binary circuit 46, thereby generating a TE signal through a DPD method. A low-pass filter 48 outputs the TE signal 31 obtained by removing an unnecessary high frequency component from the TE signal output from the phase comparing circuit 47.

Figure 3:
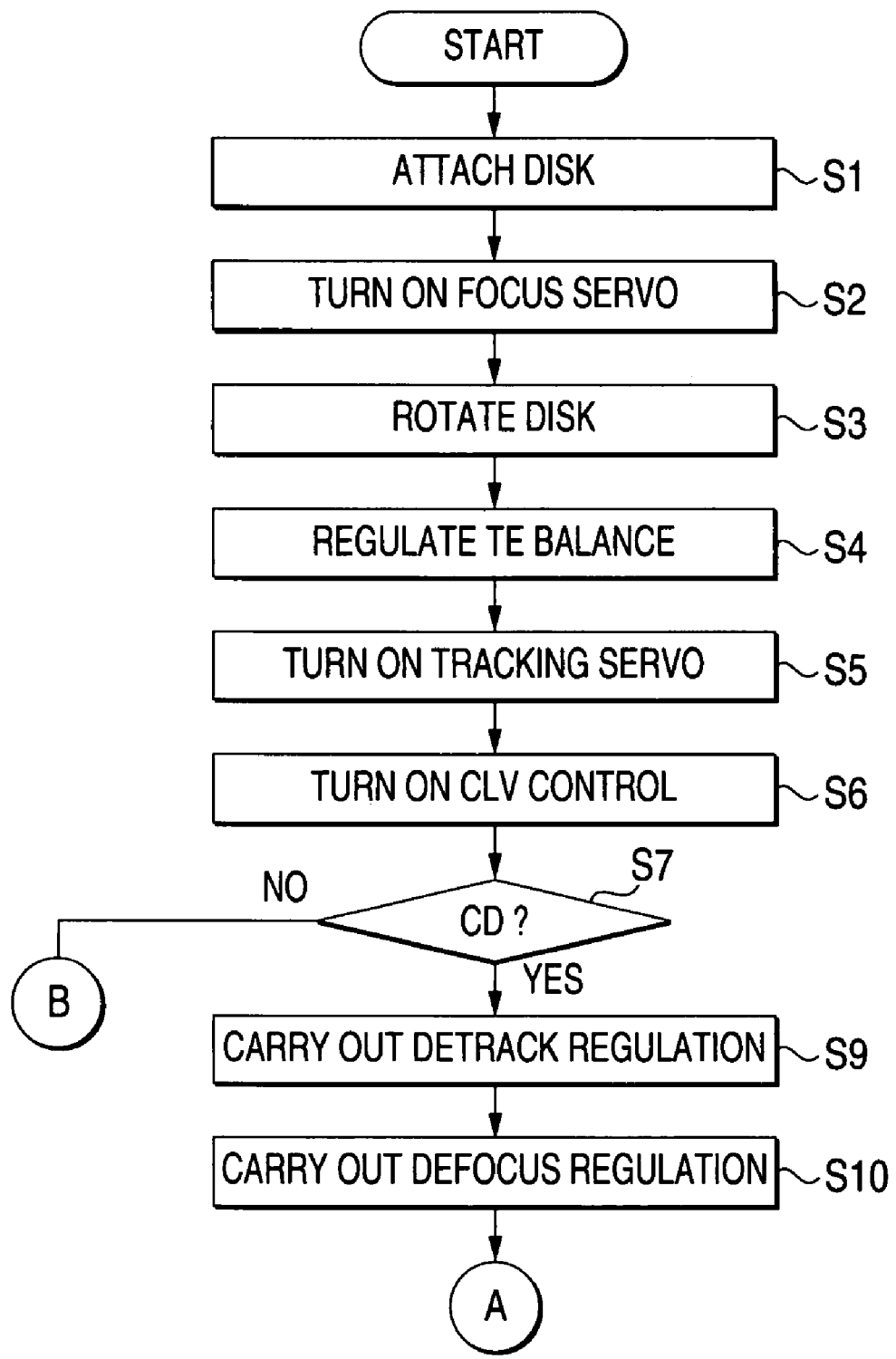
FIG. 3 is a flowchart showing a main operation according to an embodiment in an initialization when an optical disk is exchanged.
Figure 4:
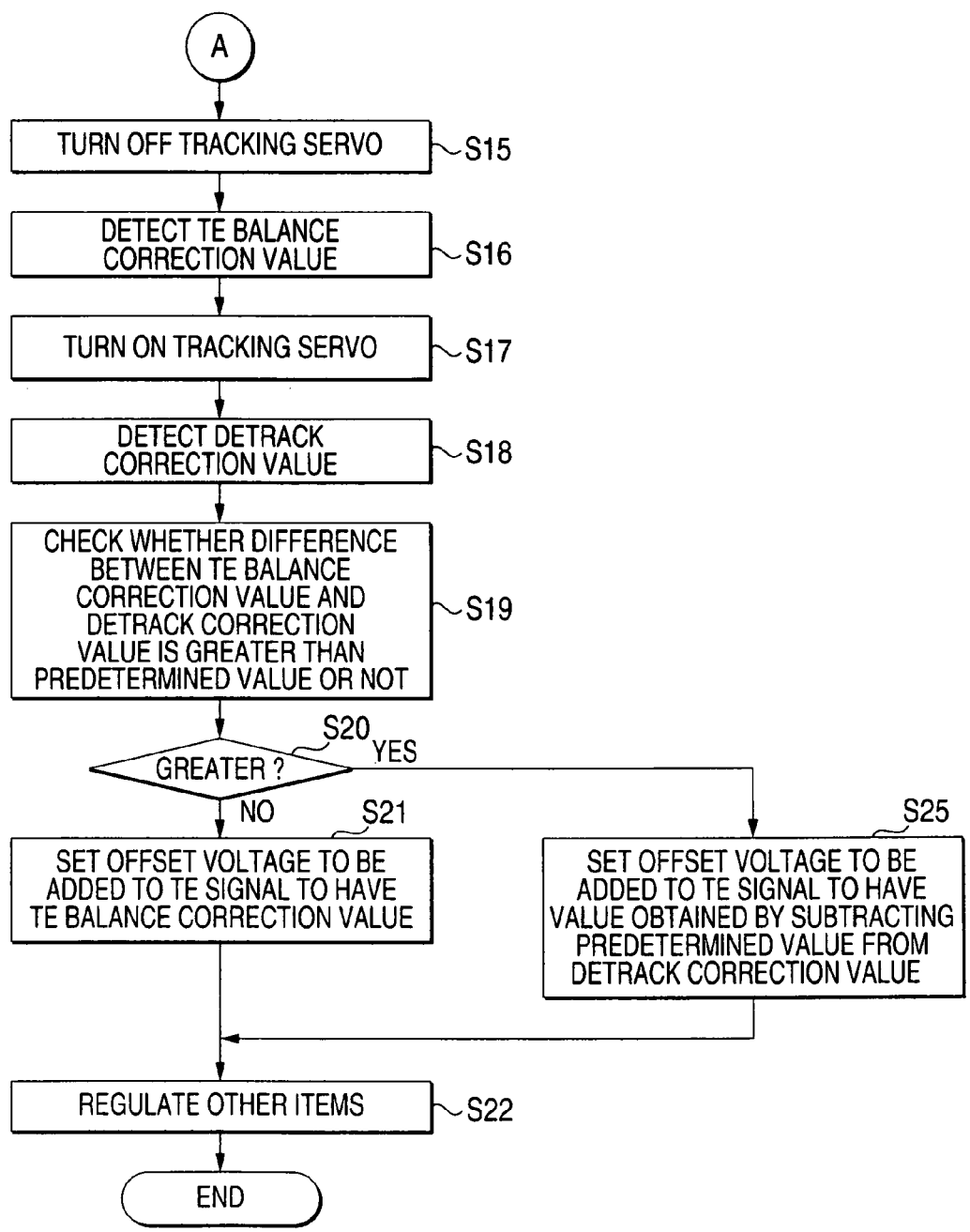
FIG. 4 is a flowchart showing a main operation according to a first embodiment in the initialization when the optical disk is exchanged.
Figure 5:
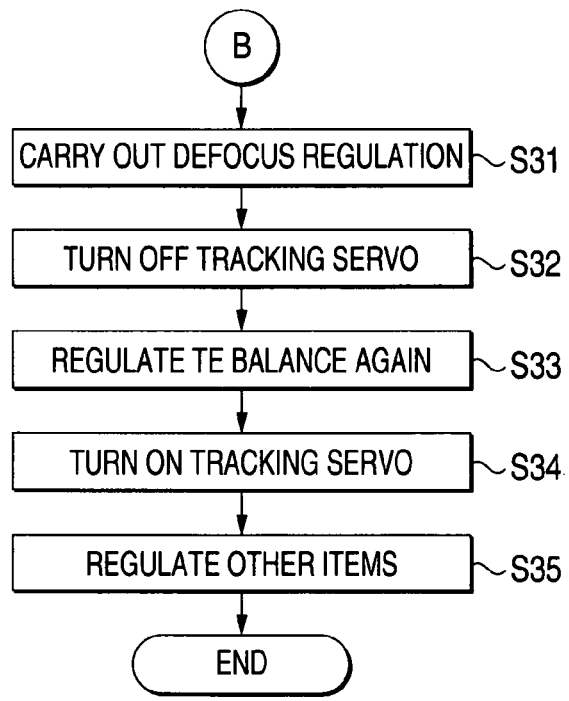
FIG. 5 is a flowchart showing the main operation according to the embodiment in the initialization when the optical disk is exchanged.

FIGS. 3 to 5 are flowcharts showing a main operation according to the first embodiment in an initialization when the optical disk 1 is exchanged. The operation according to the first embodiment will be described with reference to FIGS. 3 to 5 if necessary.

When the optical disk 1 is attached, the focus balance regulating unit 21 detects an offset voltage required for setting a central voltage of the FE signal 32 to be a reference voltage for the FE signal 32 based on a change in the level of the FE signal 32 which is obtained when the focusing actuator is driven. Then, the offset voltage 321 thus detected is added to the FE signal 32 (the servo control of the focusing becomes the most stable). Thereafter, the servo control of the focusing to be carried out by the servo control unit 8 is started (Steps S1 and S2). Subsequently, a rotation of the optical disk 1 is started (Step S3).

The TE balance regulating unit 23 detects an offset voltage required for setting the central voltage of the TE signal 31 to be a reference voltage for the TE signal 31 based on a change in the level of the TE signal 31 which is obtained when the beam spot is controlled to cross the track in an OFF state of the servo control of the tracking, and carries out a TE balance regulation for adding the offset voltage 311 thus detected to the TE signal 31 (the servo control of the tracking becomes the most stable). Then, the servo control of the tracking to be carried out by the servo control unit 8 is started (Steps S4 and S5). Moreover, a CLV control to be carried out by the servo control unit 8 is started (Step S6).

Subsequently, it is checked whether the optical disk 1 which is currently attached is a CD or a DVD (Step S7). If the optical disk 1 is the CD, the operation proceeds from the Step S7 to Step S9 and a detrack regulation is thus carried out.

More specifically, an offset voltage for giving a maximum amplitude is detected based on a change in an amplitude of the RF signal 33 which is obtained when the offset voltage 311 to be added to the TE signal 31 is changed. Then, the offset voltage 311 thus detected is added to the TE signal 31. In the servo control of the tracking, therefore, a control is carried out in such a manner that the beam spot is positioned on a center of a track with high precision (the highest signal quality of the output of the optical pickup 3 can be obtained).

When the detrack regulation is completed, a defocus regulation is carried out. More specifically, an offset voltage for giving a maximum amplitude is detected based on a change in an amplitude of the RF signal 33 which is obtained when the offset voltage 321 to be added to the FE signal 32 is changed. Then, the offset voltage 321 thus detected is added to the FE signal 32 (Step S10). In the servo control of the focusing, therefore, the control is carried out in such a manner that a focal position of the beam spot is set onto a recording plane of the track with high precision (the highest signal quality of the output of the optical pickup 3 can be obtained).

When the defocus regulation is ended, an operation for correcting an amount of a shift of a TE balance generated by the defocus regulation is started. More specifically, the servo control of the tracking is set to be OFF (Step S15) and a control for causing the beam spot to cross the track is carried out. Then, an offset voltage (a TE balance correction value) for setting the amount of a shift of the TE balance to be zero is detected based on a change in a level of the TE signal 31 at this time (Step S16).

Subsequently, the servo control of the tracking is restarted (Step S17) and an offset voltage (a detrack correction value) for giving a maximum amplitude is detected based on a change in the amplitude of the RF signal 33 which is obtained when the offset voltage 311 to be added to the TE signal 31 is changed (Step S18). Thereafter, it is checked whether a difference between the TE balance correction value and the detrack correction value which are detected is greater than a predetermined value or not (Step S19).

Prior to the detailed description of the Step S19, description will be given to the TE balance correction value detected at the Step S16 and the detrack correction value detected at the Step S18.

Figure 7A:
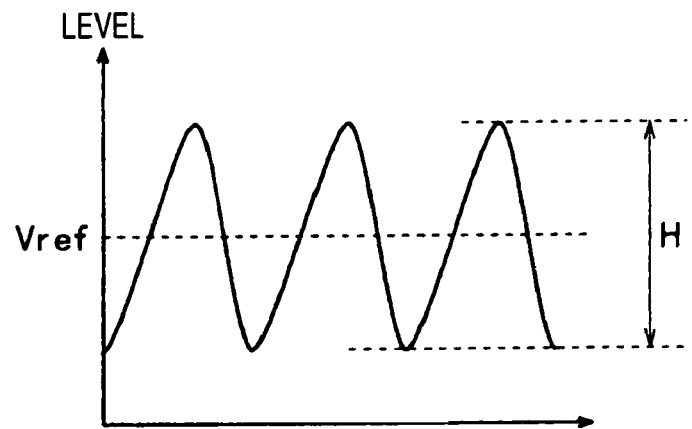
FIGS. 7A, 7B and 7C are explanatory charts showing a relationship between a level of the tracking error signal and a TE balance correction value in the case in which a beam spot crosses a track.
Figure 7B:
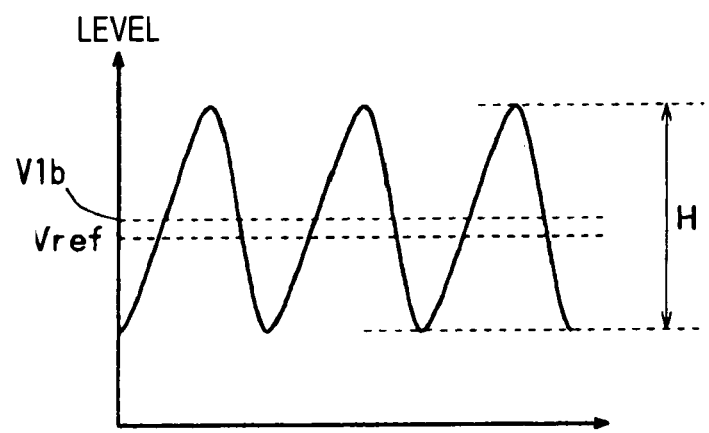
Figure 7C:
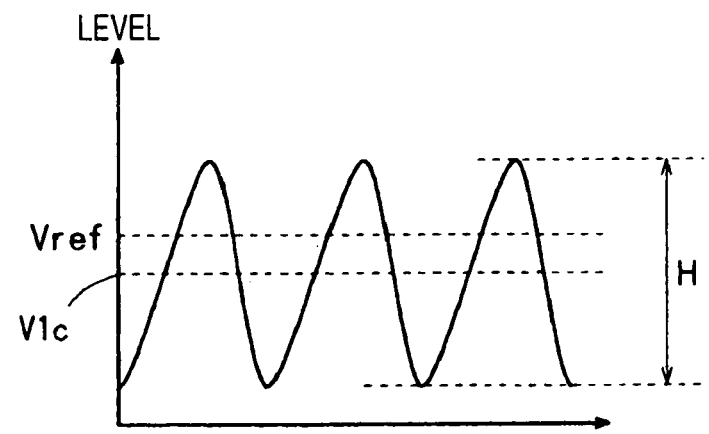

FIGS. 7A, 7B and 7C are explanatory charts showing a relationship between the change in the level of the TE signal 31 and the TE balance correction value in the case in which the beam spot crosses the track. In the following description, the TE balance correction value is represented by BAL. Moreover, a unit of the TE balance correction value BAL is indicated as a ratio [%] of an offset voltage to a value of a half of a wave height H of the TE signal 31 in such a manner that it is not necessary to take a difference in the wave height of the TE signal 31 into consideration.

When the TE signal 31 in the case in which the beam spot crosses the track has a waveform shown in FIG. 7A and the central voltage of the TE signal 31 is equal to a reference voltage (represented by Vref), the offset voltage required for causing the central voltage of the TE signal 31 to be equal to the reference voltage is 0V. Accordingly, BAL=0 [%] is obtained.

When the TE signal 31 in the case in which the beam spot crosses the track has a waveform shown in FIG. 7B and the central voltage of the TE signal 31 is equal to V$1b$, moreover, the offset voltage required for causing the central voltage V$1b$ of the TE signal 31 to be equal to the reference voltage Vref is expressed in (Vref−V$1b$). Accordingly, the TE balance correction value BAL=(Vref−V$1b$)×50/H [%] is obtained (The value is negative). When the TE signal 31 in the case in which the beam spot crosses the track has a waveform shown in FIG. 7C and the central voltage of the TE signal 31 is equal to V$1c$, furthermore, the offset voltage required for causing the central voltage V$1c$ to be equal to the reference voltage Vref is expressed in (Vref−V$1c$). Accordingly, the TE balance correction value BAL=(Vref−V$1c$)×50/H [%] is obtained (The value is positive).

Figure 8A:
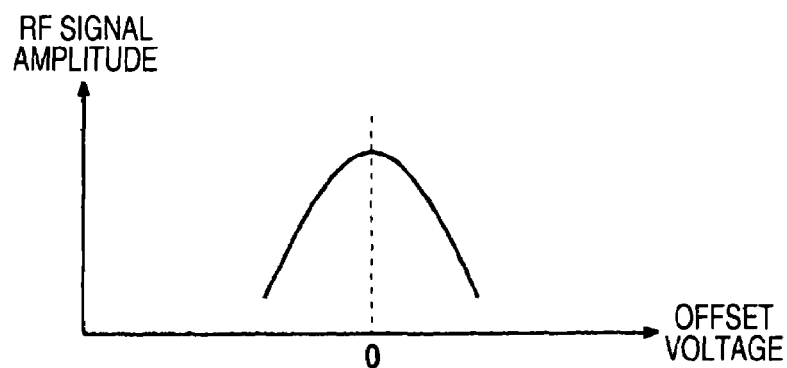
FIGS. 8A, 8B and 8C are explanatory charts showing a relationship between the offset voltage to be added to the tracking error signal and an RF signal.
Figure 8B:
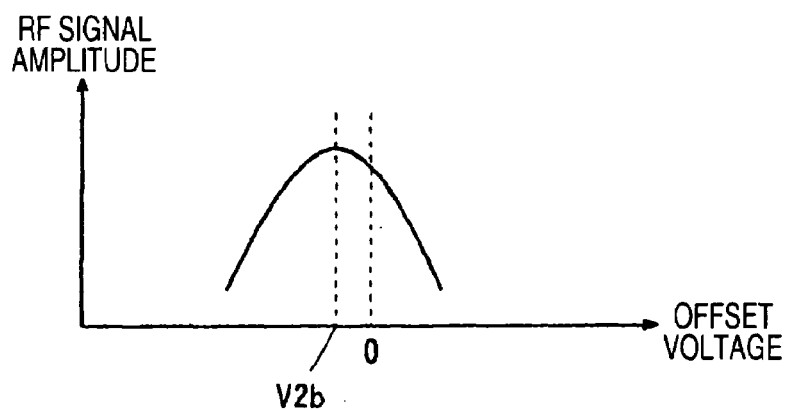
Figure 8C:
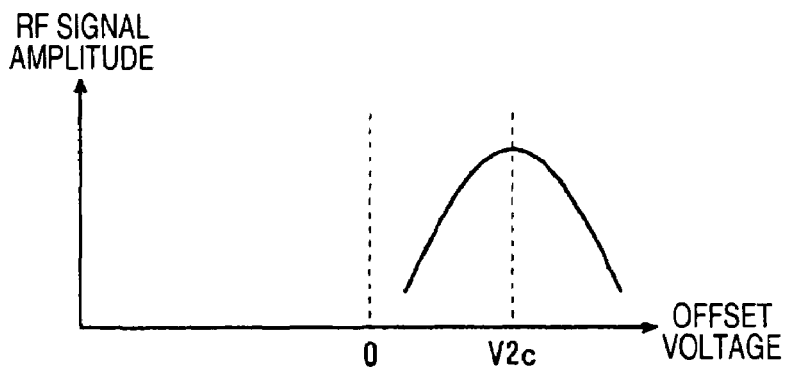

FIGS. 8A, 8B and 8C are explanatory charts showing a relationship between the offset voltage to be added to the TE signal 31 and the amplitude of the RF signal. In the following description, the detrack correction value is represented by DTR. Moreover, a unit of the detrack correction value DTR is indicated as a ratio [%] of an offset voltage to a value of a half of the wave height H of the TE signal 31 in such a manner that it is not necessary to take a difference in the wave height H of the TE signal 31 into consideration.

Assuming that the relationship between the offset voltage to be added to the TE signal 31 and the amplitude of the RF signal is obtained as shown in FIG. 8A and the amplitude of the RF signal is a maximum when the offset voltage is set to be 0V, the detrack correction value DTR is 0%.

Assuming that the relationship between the offset voltage to be added to the TE signal 31 and the amplitude of the RF signal is obtained as shown in FIG. 8B and the amplitude of the RF signal is a maximum when the offset voltage is set to be V$2b$, moreover, the detrack correction value DTR is obtained as DTR=V$2b$×50/H [%] (The value is negative). Assuming that the relationship between the offset voltage to be added to the TE signal 31 and the amplitude of the RF signal is obtained as shown in FIG. 8C and the amplitude of the RF signal is a maximum when the offset voltage is set to be V$2c$, furthermore, the detrack correction value DTR is obtained as DTR=V$2c$×50/H [%] (The value is positive).

The relationship between the TE balance correction value BAL and the detrack correction value DTR is varied depending on individual apparatuses due to a variation in the characteristic of the optical pickup 3. For this reason, the TE balance correction value BAL is 0% and the detrack correction value DTR is −10% in an apparatus, the TE balance correction value BAL is 0% and the detrack correction value DTR is 20% in another apparatus, the TE balance correction value BAL is −10% and the detrack correction value DTR is −5% in yet another apparatus, and the TE balance correction value BAL is −10% and the detrack correction value DTR is 15% in a further apparatus.

In addition, the difference between the TE balance correction value BAL and the detrack correction value DTR indicates an amount of detrack generated when the servo control of the tracking is stabilized most greatly in the case in which the offset voltage to be added to the TE signal 31 is set to be the TE balance correction value BAL or an amount of a shift of the TE balance in the servo control of the tracking generated when the offset voltage is set to be the detrack correction value DTR and the signal quality is set to be the highest. When the difference between the TE balance correction value BAL and the detrack correction value DTR is decreased, accordingly, a deterioration in the signal quality is reduced also when the servo control of the tracking is to be stabilized.

Assuming that the TE balance correction value BAL detected at the Step S16 is 0% and the detrack correction value DTR detected at the Step S18 is −5%, the difference is 5%. On the other hand, 20% is set to a predetermined value to be a criterion in the Step S19 (The reason is that a great increase is not generated in an error rate of a reproducing signal in an actual machine when the amount of detrack is equal to or smaller than 20%. Accordingly, another value can be set depending on a real ability of the actual machine).

In this case, therefore, the difference is smaller than a predetermined value and a deterioration is rarely generated on the signal quality also when the offset value is set to be the TE balance correction value BAL to stabilize the servo control of the tracking. Therefore, the offset voltage is set to be the TE balance correction value BAL (Steps S20 and S21). Then, the routine proceeds to another initializing operation (Step S22).

On the other hand, assuming that the TE balance correction value BAL is −10% and the detrack correction value DTR is 15%, the difference is 25%. In this case, when the offset voltage is set to be the TE balance correction value BAL to stabilize the servo control of the tracking, the amount of detrack is 25% to bring a detrack increasing state in which the signal quality is deteriorated. At this time, accordingly, the offset voltage is set to have a value which is close to the side of the TE balance correction value BAL (−15%) by the predetermined value (20%) from the detrack correction value DTR (15%). More specifically, the offset voltage is set to be −5% (Steps S20 and S25).

When the offset voltage is set to be −5%, the shift of the TE balance is 5%. However, it is possible to carry out a sufficiently stable servo control of the tracking. Moreover, the amount of detrack is reduced to be 20%. Consequently, the deterioration in the signal quality can be suppressed.

Figure 9A:
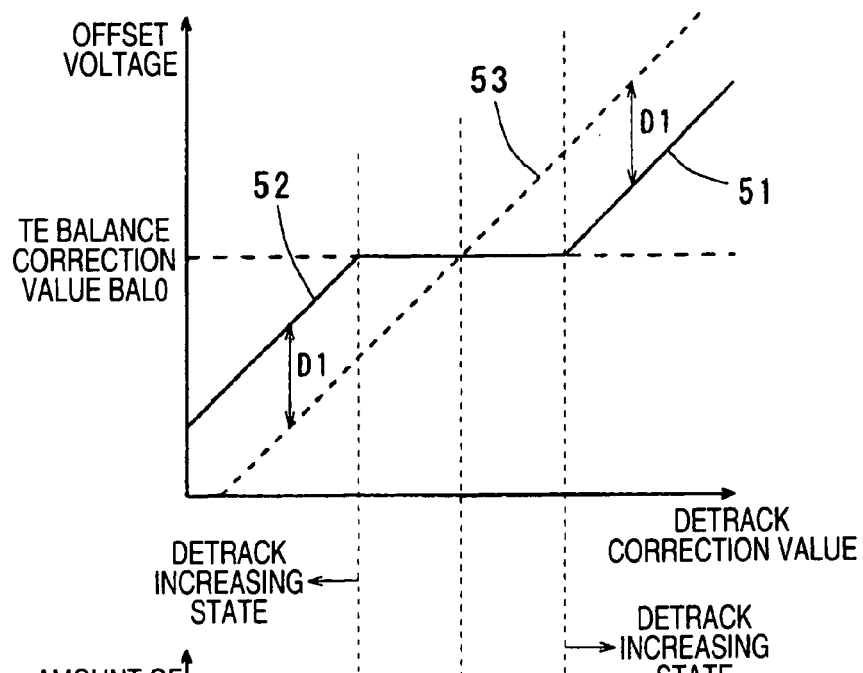
FIGS. 9A, 9B and 9C are explanatory charts showing a change in an offset voltage, a change in an amount of detrack and an amount of a shift of a TE balance in the case in which a relative relationship of a detrack correction value with a TE balance correction value is indicated as an axis of abscissas.

FIG. 9A shows a change in the offset voltage in the case in which a relative relationship of the detrack correction value with the TE balance correction value (represented by BAL0) is indicated as an axis of abscissas, and a broken line 53 indicates a relationship between the detrack correction value and the offset voltage in the case in which the offset voltage is set to have a value which is equal to the detrack correction value.

As shown in FIG. 9A, when the detrack correction value is set within of a predetermined value D1 (20%) with respect to the TE balance correction value BAL0 (when the difference is smaller than 20%), the offset voltage is set to be the TE balance correction value BAL0. On the other hand, when the difference exceeds 20%, that is, the detrack increasing state is brought and the detrack correction value DTR is greater than the TE balance correction value BAL, an offset voltage Vofs can be expressed as follows.

$$Vofs=DTR-D1$$

In the case in which the detrack correction value DTR is smaller than the TE balance correction value BAL, moreover, the following is obtained.

$$Vofs=DTR+D1$$

In other words, as shown in solid lines 51 and 52, the offset voltage Vofs is set to have a value which is close to the side of the TE balance correction value BAL0 by a predetermined value D1 from the detrack correction value.

Figure 9B:
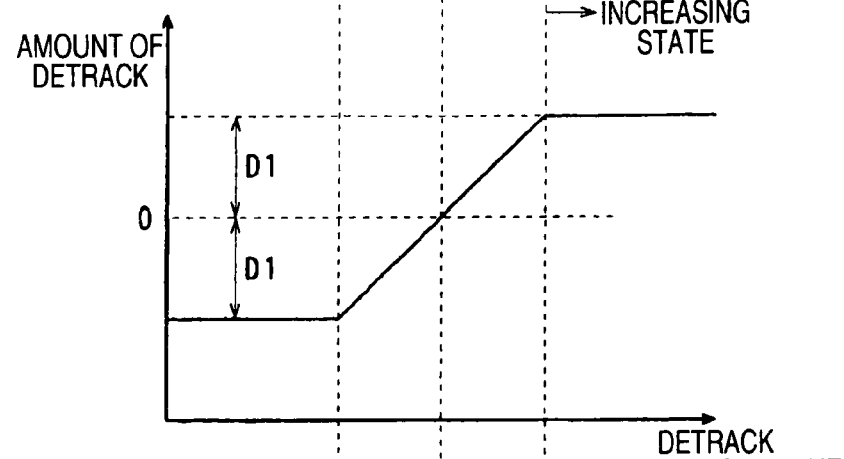

For this reason, as shown in FIG. 9B, when the detrack correction value is set within a range of the predetermined value D1 with respect to the TE balance correction value BAL0, the amount of detrack is equal to the difference between the TE balance correction value BAL and the detrack correction value DTR. When there is brought the detrack increasing state in which the difference exceeds the predetermined value D1, however, the amount of detrack is controlled to be the predetermined value D1. In other words, also when the detrack increasing state is brought, the signal quality can be prevented from being deteriorated.

Figure 9C:
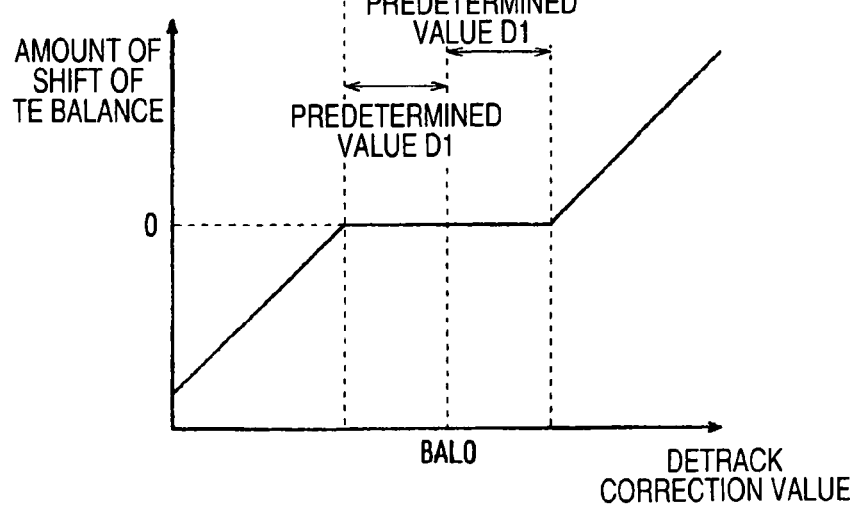

This implies that the amount of a shift of the TE balance is zero and the servo control of the tracking is thus carried out stably when the detrack correction value is set within the predetermined value D1 with respect to the TE balance correction value BAL0 as shown in FIG. 9C. Also when there is brought the detrack increasing state in which the difference exceeds the predetermined value D1, the amount of a shift of the TE balance is controlled to be a value obtained by subtracting the predetermined value D1 from the difference between the TE balance correction value BAL and the detrack correction value DTR. Therefore, it is possible to prevent the servo control of the tracking from being unstable.

If it is decided that the attached optical disk 1 is a DVD in the decision of the Step S7, the operation proceeds to Step S31 and a defocus regulation is carried out. Then, a regulation for setting the amount of a shift of the TE balance to be zero is carried out in a state in which the servo control of the racking is OFF (Steps S32 and S33). Subsequently, the servo control of the tracking is restarted (Step S34) and other items are thereafter regulated (Step S35).

Figure 6:
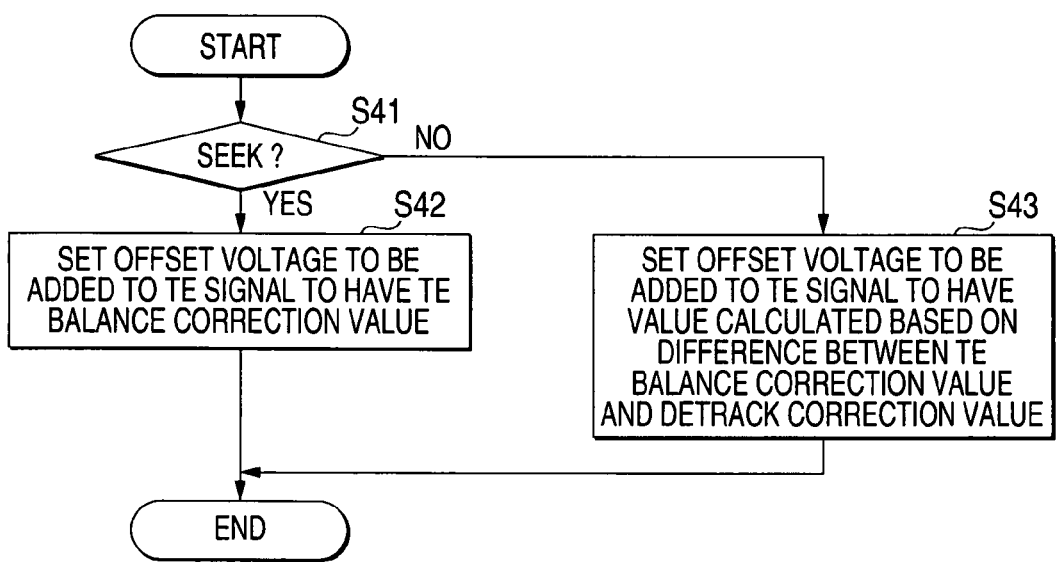
FIG. 6 is a flowchart showing the main operation according to the embodiment in switching of an offset voltage to be added to a tracking error signal.

After the initializing operation is ended, the offset voltage is set to be equal to the TE balance correction value when the seeking operation is to be carried out (Steps S41 and S42 in FIG. 6). On the other hand, when a reproducing operation for following the track is to be carried out, the offset voltage is set as in the Step S21 or the Step S25 (Steps S41 and S43).

EXAMPLE 2

A second embodiment will be described below. When the second embodiment is shown in a block diagram illustrating an electrical structure, the same structure as shown in FIG. 1 is employed and only a TE offset correcting unit has a different structure. For this reason, description will be given to only a structure of a TE offset correcting unit 25.

The TE offset correcting unit 25 sets an offset voltage 311 to be added to a TE signal 31 to have a TE balance correction value when a difference between a TE balance correction value and a detrack correction value is smaller than a predetermined value, that is, an amount of detrack is smaller than a predetermined value in the case in which the offset voltage 311 is set to be a voltage (the TE balance correction value) at which an amount of a shift of a TE balance is zero.

On the other hand, when the difference between the TE balance correction value and the detrack correction value is greater than the predetermined value (a detrack increasing state), that is, the amount of detrack is larger than the predetermined value in the case in which the offset voltage 311 is set to be the voltage (the TE balance correction value) at which the amount of a shift of the TE balance is zero, an offset voltage to be added to the TE signal 31 is set to be a value obtained by adding, to the TE balance correction value, a value obtained through a multiplication, by a predetermined coefficient α (an optional value of 0 to 1), of a value obtained by subtracting the predetermined value from the difference between the TE balance correction value and the detrack correction value.

Figure 10:
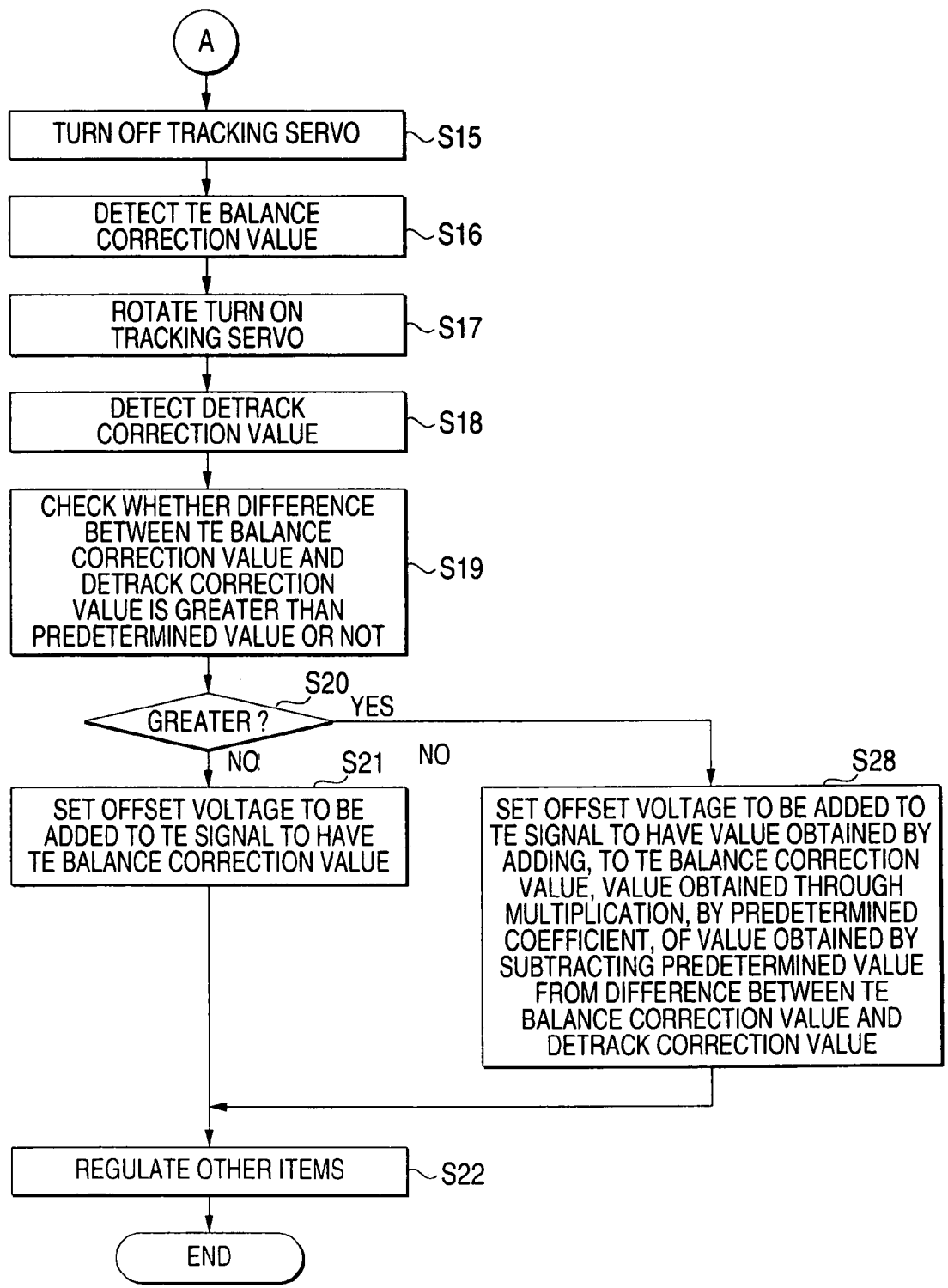
FIG. 10 is a flowchart showing a main operation according to a second embodiment in the initialization when the optical disk is exchanged.

FIG. 10 is a flowchart showing a part of a main operation according to the second embodiment in an initialization, and the same reference numerals as those in FIG. 4 are given to the same Steps as those in FIG. 4.

The operation according to the second embodiment and the operation according to the first embodiment are different from each other only in the case in which the difference between the TE balance correction value and the detrack correction value is greater than the predetermined value, and the other operations are the same. For this reason, description will be given to an operation to be carried out when it is decided that the difference between the TE balance correction value and the detrack correction value is greater than the predetermined value.

When it is decided that the difference between the TE balance correction value and the detrack correction value is greater than the predetermined value, the TE offset correcting unit 25 sets the offset voltage to be added to the TE signal 31 as the value obtained by adding, to the TE balance correction value, the value obtained through the multiplication, by the predetermined coefficient α (for example, 0.5), of the value obtained by subtracting the predetermined value from the difference between the TE balance correction value and the detrack correction value.

Figure 11A:
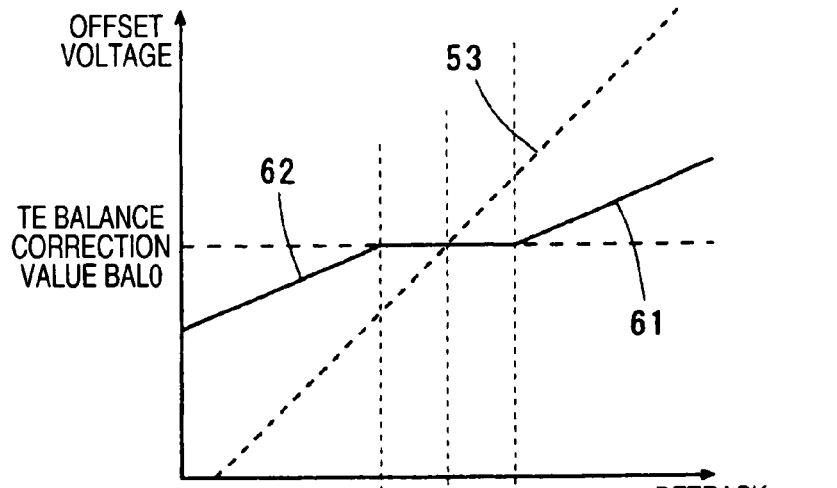
FIGS. 11A, 11B and 11C are explanatory charts showing a change in an offset voltage, a change in an amount of detrack and a change in an amount of a shift of a TE balance in the case in which a relative relationship of a detrack correction value with a TE balance correction value is indicated as an axis of abscissas.

FIG. 11A shows a change in the offset voltage in the case in which a relative relationship of the detrack correction value with the TE balance correction value is indicated as an axis of abscissas, and a broken line 53 indicates a relationship between the detrack correction value and the offset voltage which is obtained when the offset voltage is set to have an equal value to the detrack correction value.

When the detrack correction value is set within a predetermined value D2 (for example, 1.5%) with respect to a TE balance correction value BAL0 (when the difference is smaller than 15%), the offset voltage is set to be the TE balance correction value BAL0.

On the other hand, when the difference exceeds 15%, that is, the detrack increasing state is brought and a detrack correction value DTR is greater than the TE balance correction value BAL0, an offset voltage Vofs is obtained as follows.

$$Vofs=((DTR-BAL0)-D2)\times\alpha+BAL0$$

When the detrack correction value DTR is smaller than the TE balance correction value BAL, moreover, the following equation is obtained.

$$Vofs=((DTR-BAL0)+D2)\times\alpha+BAL0$$

In other words, as shown in solid lines 61 and 62, the offset voltage is set to have a value with which an amount of a shift from the TE balance correction value BAL0 is reduced.

Figure 11B:
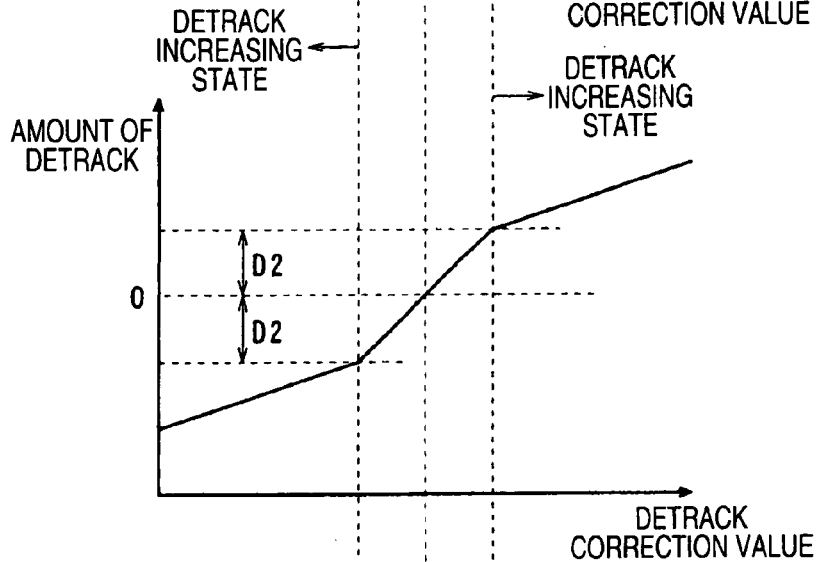
Figure 11C:
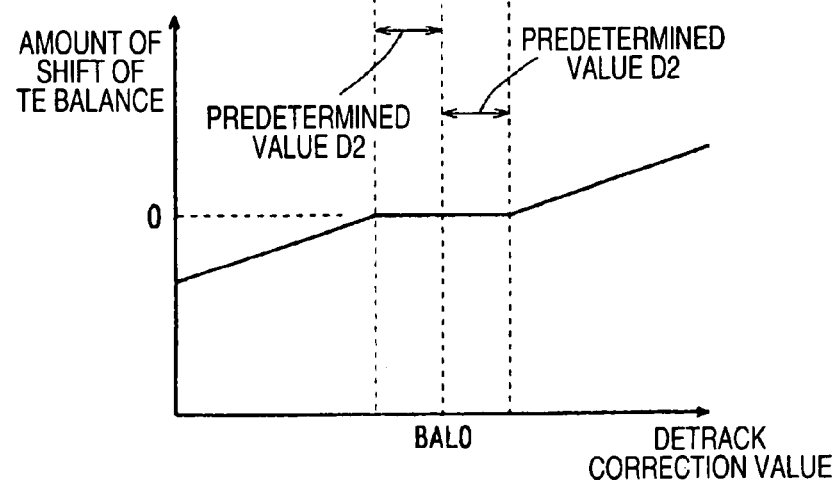
Figure 12:
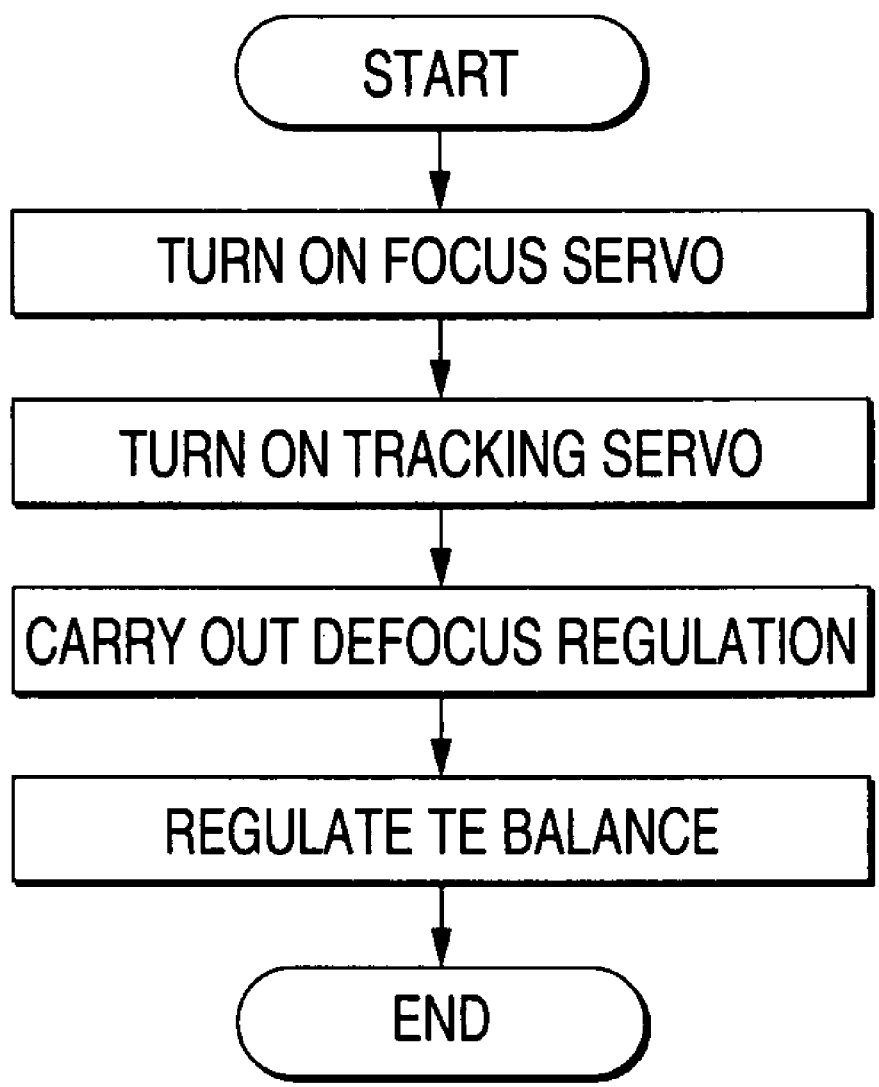
FIG. 12 is a flowchart showing an operation in an initialization according to the related art.

For this reason, as shown in FIG. 11B, when the detrack correction value is set within a range of the predetermined value D2 with respect to the TE balance correction value BAL0, an amount of detrack has a value which is equal to the difference between the TE balance correction value BAL and the detrack correction value DTR. When there is brought the detrack increasing state in which the difference exceeds the predetermined value D2, however, the amount of detrack has an increase which is smaller than an extent of an increase in the difference. For this reason, also when the detrack increasing state is brought, a deterioration in signal quality can be suppressed.

This implies that an amount of a shift of a TE balance is set to be zero and a servo control of tracking is thus carried out stably when the detrack correction value is set within the predetermined value D2 with respect to the TE balance correction value BAL0 as shown in FIG. 1C. Also when there is brought the detrack increasing state in which the difference exceeds the predetermined value D2, the amount of a shift of the TE balance is increased with a ratio of (1-α) which is controlled with respect to a ratio of an increase in the detrack correction value. Therefore, it is possible to prevent the servo control of the tracking from being unstable.

The invention is not restricted to the embodiments but the description has been given to the case in which the invention is applied to a DVD player. However, the invention can also be applied to other apparatuses including reproducing functions of a CD-R and a CD-RW (for example, a DVD recorder and a hard disk drive integral DVD recorder).

While the description has been given to the structure in which it is decided whether the signal quality of the output of the optical pickup is the highest or not based on the amplitude of the RF signal, moreover, it is also possible to employ a structure in which it is decided whether the signal quality is the highest or not based on an amount of a jitter.

Furthermore, other values can be set to be the predetermined values D1 and D2.

According to an aspect of the invention, in the detrack increasing state, the difference between the detrack correction value and the offset voltage has a constant value (a predetermined value). Also when the difference between the TE balance correction value and the detrack correction value is increased, accordingly, an amount of detrack is suppressed to have a value corresponding to the predetermined value. In a seeking operation, moreover, the amount of a shift of a TE balance is set to be zero. Therefore, it is possible to suitably suppress a deterioration in signal quality of a reproducing signal without damaging a stability of a servo control of tracking and to stabilize the seeking operation also when preventing the signal quality of the reproducing signal from being deteriorated.

According to an aspect of the invention, moreover, the offset voltage to be added to the tracking error signal is a voltage between the TE balance correction value and the detrack correction value. As compared with the case in which the offset voltage is set to have a value for setting the amount of a shift of the TE balance to be zero (the TE balance correction value), therefore, the amount of detrack has a suppressed value. Consequently, it is possible to prevent a deterioration in signal quality of a reproducing signal without damaging a stability of a servo control of tracking.

In the detrack increasing state, moreover, it is possible to suppress an increase in the difference between the offset voltage to be added to the tracking error signal and the detrack correction value. At the same time, moreover, it is also possible to suppress an increase in the difference between the offset voltage to be added to the tracking error signal and the TE balance correction value. Also when suppressing a deterioration in signal quality of a reproducing signal, therefore, it is possible to prevent a stability of a servo control of tracking from being damaged.

What is claimed is:

1. An optical disk apparatus comprising:

servo control means for carrying out a servo control of tracking of an optical pickup based on a tracking error signal;

TE balance regulating means for detecting a TE balance correction value to be an offset voltage, which is to be added to the tracking error signal, for equalizing, with a reference voltage, a central voltage of the tracking error signal when a beam spot of the optical pickup crosses a track;

detrack regulating means for detecting a detrack correction value to be an offset voltage, which is to be added to the tracking error signal, for causing signal quality of an output of the optical pickup to be the highest; and TE offset correcting means for setting an offset voltage, which is to be added to the tracking error signal, to be the TE balance correction value when the beam spot is caused to follow the track and a difference between the TE balance correction value and the detrack correction value is smaller than a predetermined value, setting the offset voltage, which is to be added to the tracking error signal, to a value being close to a side of the TE balance correction value by the predetermined value from the detrack correction value when the beam spot is caused to follow the track and there is brought a detrack increasing state in which the difference is greater than the predetermined value, and setting the offset voltage, which is to be added to the tracking error signal, to be the TE balance correction value when a seeking operation is carried out.

2. An optical disk apparatus comprising:

a servo controller, operable to carry out a servo control of tracking of an optical pickup based on a tracking error signal;

a TE balance regulator, operable to detect a TE balance correction value for equalizing, with a reference voltage, a central voltage of the tracking error signal when a beam spot of the optical pickup crosses a track;

a detrack regulator, operable to detect a detrack correction value for causing signal quality of an output of the optical pickup to be the highest; and a TE offset corrector, operable to set an offset voltage, which is to be added to the tracking error signal, to be the TE balance correction value when a difference between the TE balance correction value and the detrack correction value is smaller than a predetermined value, and to set the offset voltage to be a value between the TE balance correction value and the detrack correction value when the difference is greater than the predetermined value.

3. The optical disk apparatus according to claim 2, wherein when the difference is greater than the predetermined value, the offset voltage is set to be a value being close to a side of the TE balance correction value by the predetermined value from the detrack correction value.

4. The optical disk apparatus according to claim 2, wherein when the difference is greater than the predetermined value, the offset voltage is set to be a value being obtained by adding, to the TE balance correction value, a value obtained through multiplication, by a predetermined coefficient, of a value obtained by subtracting the predetermined value from the difference.

* * * * *